June 5, 1956 S. G. ZERVOS ET AL 2,748,983
DUAL CHANNEL SALT AND PEPPER SHAKER
Filed April 7, 1954 2 Sheets-Sheet 1

INVENTOR.
Speros G. Zervos
Peter G. Makris
BY Myron J. Dikeman
ATTORNEY

June 5, 1956 S. G. ZERVOS ET AL 2,748,983
DUAL CHANNEL SALT AND PEPPER SHAKER
Filed April 7, 1954 2 Sheets-Sheet 2

INVENTOR.
Speros G. Zervos
Peter G. Makris
BY Myron J. Dikeman
ATTORNEY

2,748,983

DUAL CHANNEL SALT AND PEPPER SHAKER

Speros G. Zervos and Peter G. Makris, Detroit, Mich.

Application April 7, 1954, Serial No. 421,544

5 Claims. (Cl. 222—142.4)

The object of our invention is to produce a dual salt and pepper shaker adapted for dispensing both ingredients, either jointly or severally, at will of the operator.

Another object is to provide a dual ingredient dispenser controllable by separated channel wall passages leading from separated casing chambers.

A further object is to provide a dual chamber salt and pepper shaker with sealed separated compartments, preventing any leakage of inclosed ingredients, between the respective chambers, and both controllable by operator.

A still further object is to provide a dual ingredient dispenser with controllable outlet means, for regulating, or sealing the respective chambers when not in operation.

Another is to produce a sealable, controllable dual salt and pepper shaker that is simple in construction, easily and efficiently operated, and that can be manufactured at a very low cost.

These several objects are attained in the preferred form by the construction and arrangement of parts as are more fully hereinafter set forth.

Similar parts on all drawings are marked by similar numerals or letters.

Figure 11:
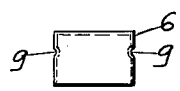
Figure 12:
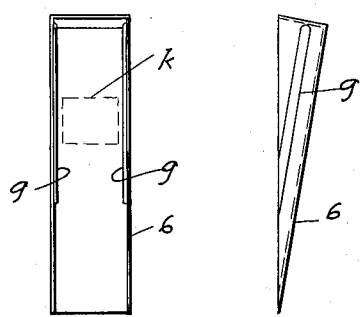
Figures 9, 10:
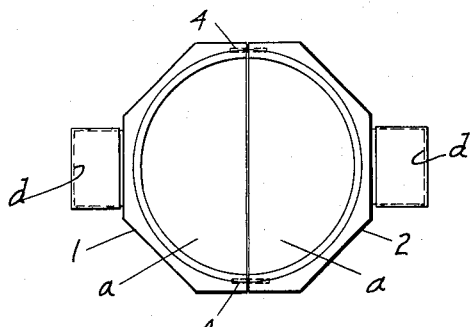
Fig. 9 is likewise a similar bottom view, as in Fig. 3, showing the divided casing half-sections with the seal casing units mounted thereon.

Figs. 10, 11, and 12 are detailed views of the discharge outlet seal casing unit, showing the groove slide means for adjustably mounting same over the discharge channel rib walls.

It is known that there are other dual salt and pepper shaker units of record, but not of the specific design, operation and control as herein disclosed, nor producing the results obtainable by this new structural combination.

In general, our dual salt and pepper shaker comprises a vertical octagonal chambered casing, formed in half sections joined together, and assembled with a central vertical partition wall separating same, forming dual sealed compartment chambers, each chamber being provided with a receding discharge channel formed within the casing outer wall.

We will now describe more fully the detailed construction of our device, referring to the drawings and the marks thereon.

Figure 2:
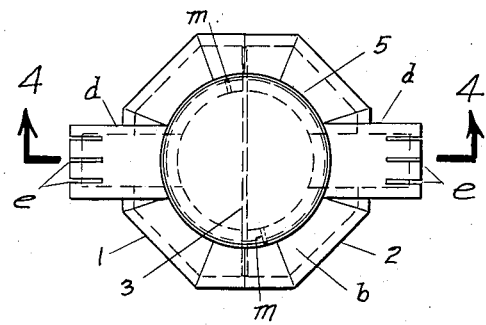
Fig. 2 is a top view of the shaker unit, showing the relative position of the dual channel passage ribs, and the discharge recesses.
Figure 4:
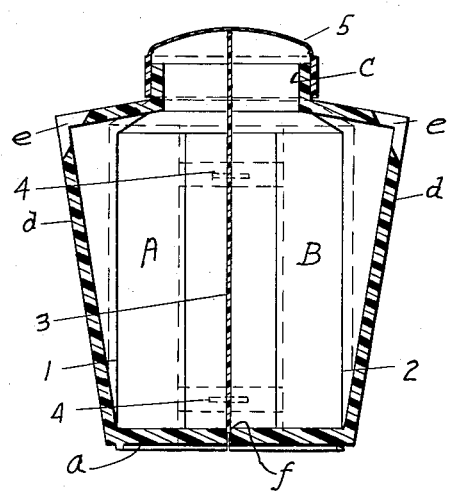
Fig. 4 is a vertical sectional view taken on the line 4—4 of the Fig. 2, showing the relative position of the interior operating parts.
Figure 1:
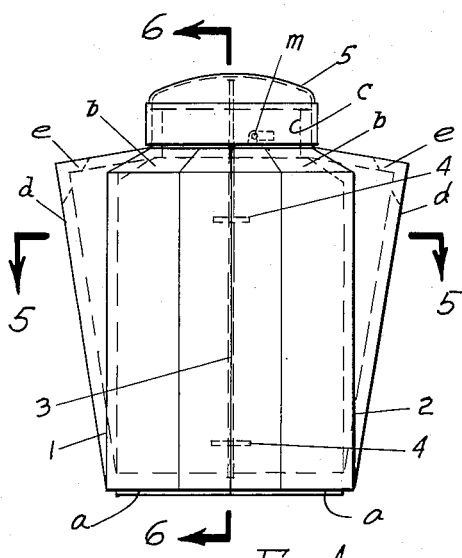
Fig. 1 is an elevation view of our dual channeled salt and pepper shaker, showing the general exterior design.
Figure 3:
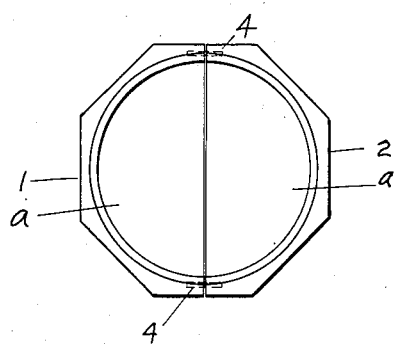
Fig. 3 is a bottom view of the shaker unit casing, showing the casing section assembly.
Figure 5:
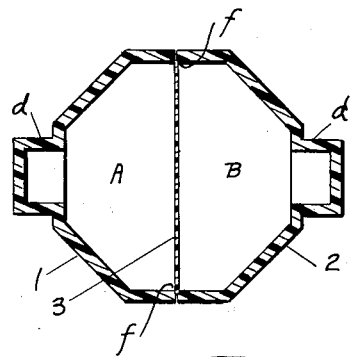
Fig. 5 is a cross-sectional view taken on the line 5—5 of the Fig. 1, showing the separated ingredient chambers and their respective discharge channels.

The casing body is preferably of an octagonal design for providing parallel opposite side wall, and for convenience is formed of two vertical half sections 1 and 2, preferably molded of plastic, or some similar suitable material. The assembled sections are designed with a closed bottom section $a$ and with a semi-conical open top section $b$, designed with a short cylindrical neck $c$ projected vertically therefrom. Each half-section 1 and 2 is designed with a receding rectangular shaped closed discharge channel rib $d$ projected outward from opposite casing side wall panels, and open within the respective chamber for the full length thereof. Within the discharge channel upper ends are formed narrow outlet slots, or perforations $e$, leading through the channel wall. Around the contacting edges of the adjoining assembled helf-sections 1 and 2, are formed narrow inner edge grooves $f$, extending the full edge length of both wall units, designed for receiving and retaining therein a thin partition wall panel 3, completely separating said casing into two separate chamber compartments A and B. The assembled casing sections 1 and 2 are securely retained in closed contact position by the dowel pins 4 firmly mounted within adjoining casing edges, and are more securely locked together by the circular dome cap 5 firmly mounted over the projected neck section $c$. The cap 5 may be more securely attached, if desired, by forming a tightly compressed joint therebetween, or by uniting the contacting parts by thread, or pin and slot means $m$ as indicated on the Fig. 1 of the drawings. The central partition wall 3 is designed to project through the casing neck section $c$, and fit and seal completely with the dome cap 5, providing separated, sealed ingredient chambers A and B opening into their respective discharge channel passages $f$.

Figure 8:
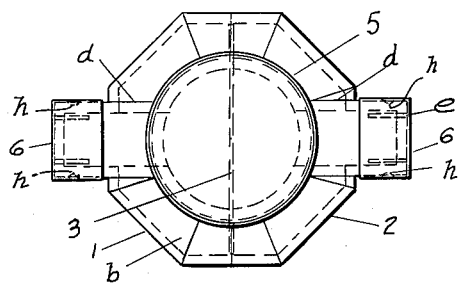
Figs. 7 and 8 are illustrative of the similar views shown in the Figs. 1 and 2, but modified with special discharge channel outlet seal casing units, slidably mounted thereon.
Figure 6:
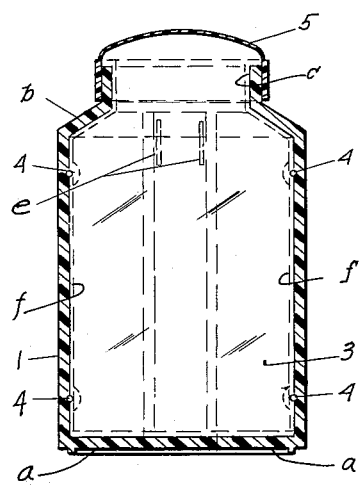
Fig. 6 is a vertical sectional view taken on the line 6—6 of the Fig. 1, showing the dual compartment intervening wall separating same, and means for mounting and sealing same.
Figure 7:
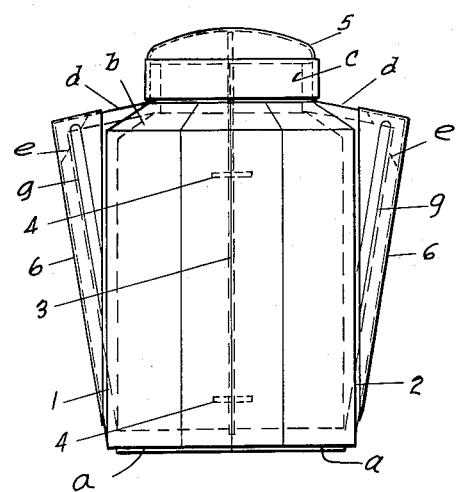

When desired, the projected discharge channel ribs $d$ may be provided with special outlet seal casings 6, made of thin metal, preferably of polished plated material, formed in a taped box design for snugly fitting over said rib projections, as illustrated in the Figs. 7 and 8 of the drawings. The seal casing side walls are preferably formed with inner wall ridges $g$ projected therefrom, positioned for engaging special wall slots $h$ formed in the rib outer side walls, allowing said seal casing 6 to be displaced lengthwise thereon, for mounting, or removing same, and for retaining same in a closed sealed position over the inclosed discharge perforations $f$. If desired, a special wall opening $k$ may be formed through the seal casing central wall, positioned to coincide with the discharge outlet perforations $f$, when partly withdrawn, allowing the operation of the respective chamber discharge, without completely removing said seal casing units.

For convenience of the user of our dual salt and pepper shaker, the adjoining casing half-sections 1 and 2 may be made of different colored material, such as "red" for the pepper compartment, and "white" for the salt chamber.

For operation, the dual salt and pepper shaker dome cap 5 is removed from the casing neck, by slight sidewise rotation thereof, releasing same from lock pin $m$, and the cover cap may then be removed, allowing re-filling of both salt and pepper compartments A and B, and the cap then replaced and locked. By removal of the respective outlet seal casing 6, or the readjustment of same to its open position (if seal casings are used), the desired ingredient may be sifted from the respective discharge perforations $f$, by shaking the casing in the usual manner. The seal casing being returned in place when not in use.

However, when applying the dual salt and pepper shaker to extensive cooking operations (when the respective discharge perforations are properly synchronized with each other for size) both salt and pepper may be discharged therein at the same time, and in proper proportions.

While the dual casing is herein described for salt and pepper, it is to be understood it applies equally as well to any two selected powdered ingredients, and discharged in the same manner.

Having fully described our dual salt and pepper shaker, what we claim as our invention and desire to secure by Letters Patent is:

1. A dual channel ingredient dispenser adapted for regulated discharge of selected ingredients, and used therewith, comprising a dual chambered casing formed with a central neck opening common to both chambers, a seal cap fixedly mounted over said casing neck opening, separating and sealing said dual chambers from each other, a discharge channel rib projected from opposite outside casing walls, each positioned centrally with the respective dual chambers and opening therein, and predetermined outlet discharge ports formed through said channel rib upper ends, opening therein, for dispensing the respective chambered ingredient therethrough when said casing is inverted.

2. A dual channel salt and pepper shaker adapted for regulated discharge of selected granulated ingredients, and used therewith, comprising a dual chambered casing formed with a central inlet opening common to both chambers, a seal cap detachably mounted over said inlet opening, designed for completely sealing said dual chambers from each other, a receding discharge channeled rib projected from opposite outer casing walls, centrally positioned with the respective separated dual chambers, and opening therein for the full length of said chambers, and predetermined discharge outlet perforations formed through said channel ribs, at the upper ends thereof and opening therein, designed for dispensing the selected ingredients therethrough when said casing is inverted for shaking.

3. A dual channel salt and pepper shaker adapted for regulated discharge of selected salt and pepper ingredients, and used therewith, comprising a closed chamber casing constructed of symmetrical vertical half-section units, fixedly joined together and formed with a cylindrical neck opening through the upper casing walls, common to both half-sections, a thin partition wall panel vertically mounted and fitted between said casing half-section adjoining edges, dividing said casing into dual chamber compartments, a cylindrical dome seal cap detachably mounted over said neck section opening, completely sealing said separated chamber sections from each other, each of said casing half-sections being formed with a closed, receding discharge channel rib projected centrally from the casing outer side wall and opening into the respective chamber recesses for the full length thereof, and restricted discharge outlet openings formed through said discharge channel rib upper ends, designed for dispensing the chambered salt and pepper ingredients therethrough when said dual casing is inverted toward the selected ingredient compartment.

4. A dual channel salt and pepper shaker adapted for discharge of the selected ingredient therefrom, and used therewith, comprising a closed octagonal chambered casing constructed of two vertical half-section units, means for joining said two half-sections rigidly together, said octagonal half-sections being formed with a central neck opening through the upper casing walls common to both, a thin partition wall panel vertically mounted and fitted between said two half-casing unit adjoining edges dividing said assembled casing into two chamber compartments, a dome seal cap fitted over said common neck opening, means for rigidly locking said seal cap on said neck opening, and completly sealing said dual chambers from each other, each of said octagonal chamber half-section units being formed with a closed, rectangular shaped discharge channel rib projected from the central side panel outer wall and open within said chamber for the full length thereof, and predetermined outlet perforations formed through each of said discharge channel ribs at the upper ends thereof, designed for dispensing the chambered powdered ingredients therethrough when casing is inverted toward the selected ingredient chamber.

5. A dual channel salt and pepper shaker adapted for controlled discharge of selected powdered ingredients, and used therewith, comprising a closed octagonal chambered casing constructed of two vertical half-section units, dowel pin means for rigidly joining said half-sections together, said half-section units being formed with an extended central cylindrical neck opening projected through the casing top wall, common to both sections, a thin partition wall panel vertically mounted between said half-sections within grooves formed within the section wall edges the full length thereof, dividing said casing into dual chamber compartments, a cylindrical dome seal cap firmly mounted over said common cylindrical neck opening, completely sealing said dual chamber compartments from each other, pin and groove lock means mounted on said neck section for rigidly connecting said seal cap thereto, each of said octagonal casing half-sections being formed with a closed, rectangular shaped receding discharge channel rig projected from the central side panel thereof for the full casing length, said channels opening into the respective dual chamber compartment, outlet perforations formed through the said channel rib upper ends opening into the respective chamber, each of said rectangular discharge channel ribs being formed with recess slide grooves along opposite side walls, parallel with the receding outer edge thereof, and seal caps slidably mounted over said grooved discharge channel rib, within said slide grooves, adjustable thereon for closing, or opening the inclosed outlet perforations formed through the rib sections.

References Cited in the file of this patent

UNITED STATES PATENTS

| | | |
|---|---|---|
| 1,568,160 | Hibbert | Jan. 5, 1926 |
| 1,927,149 | Belefant | Sept. 19, 1933 |
| 2,113,604 | Richter | Apr. 12, 1938 |
| 2,376,855 | Hanley | May 29, 1945 |
| 2,679,952 | Carpenter | June 1, 1954 |